Sept. 6, 1966    C. BARBARESCHI    3,270,432
APPARATUS FOR REMOVING SOLVENT FROM A SOLUTION
Filed March 1, 1963
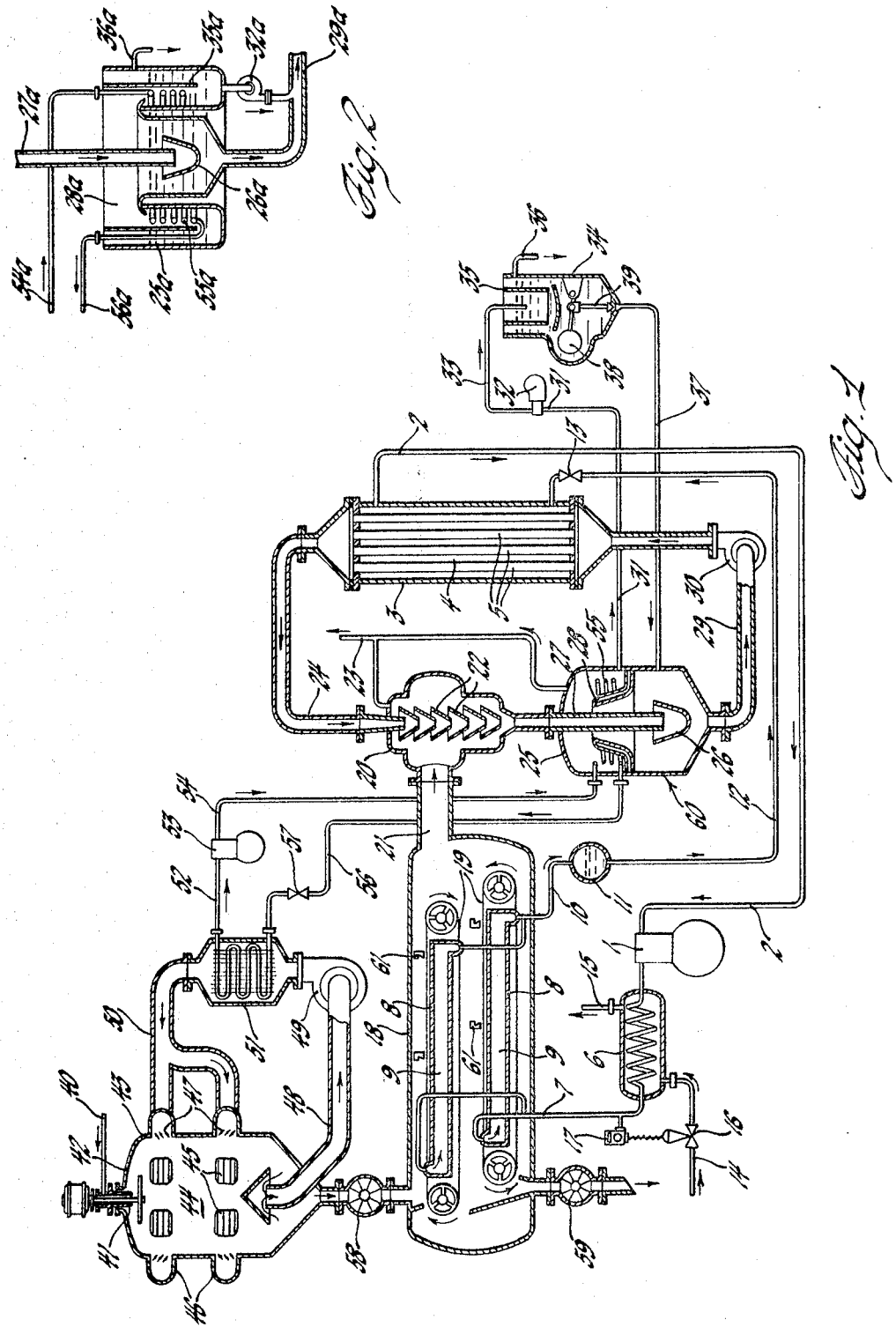

United States Patent Office 3,270,432
Patented Sept. 6, 1966

3,270,432
APPARATUS FOR REMOVING SOLVENT FROM A SOLUTION
Carlo Barbareschi, Via San Gallo 40, Milan, Italy
Filed Mar. 1, 1963, Ser. No. 262,822
Claims priority, application Italy, Mar. 1, 1962, 4,069/62
1 Claim. (Cl. 34—92)

The invention relates to apparatus and a process for the removal of solvent from a solution, aqueous or otherwise and to the recovery of at least the solute; the solvent being also recoverable if desired. Drying by sublimation or lyophilization at low temperature near the freezing point of the solvent under high vacuum is becoming increasingly commercially important. It is difficult directly to freeze out the solvent from a solution because the efficiency of the freezer decreases as it becomes iced up, and it is difficult uniformly to heat the resulting solid to drive off the solvent. Excessive local heating may lead to dehydration, caramelization, discoloration or loss of flavor or scent.

The invention provides a process of removing solvent from a solution wherein the solution is pulverized and frozen and the frozen solution is heated so that the solute sublimes and the solvent evaporates, the solute at least being recovered.

The invention includes apparatus for continuously removing solvent from a solution, comprising in series a pulverizer for the solution, a freezer, a valve for transferring frozen solution, a chamber for the sublimation and evaporation of the solvent, and means for the recovery of the solute. The apparatus of the invention may include means for the recovery of the solvent which comprises means for contacting the solvent vapor with an auxiliary vapor having a lower liquefaction point, and a freezer for separating the solvent as a solid.

The pulverizer used in the invention may be of the centrifugal or nozzle type for example. The valve for transferring frozen solution should be capable of maintaining a pressure difference between the freezer and the ensuing chamber. The auxiliary liquid should not be freezable under the intended conditions of operation and its vapor pressure under these conditions should always be lower than that of the solvent so as to effect a raising of the boiling point. Alternatively, the auxiliary liquid may be replaced by the solvent itself so as to obviate the necessity for subsequent separation. Generally the auxiliary liquid should differ from the solvent markedly in a physical property which facilitates separation, such as density, by a method such as decantation, centrifuging, evaporation, or absorption. As the frozen solution loses its solvent by evaporation, the solid material should be maintained in a porous state. If the chamber contains a belt onto which the frozen solution falls, and a heater plate beneath the belt, then the porous state may be maintained by comb-like agitators projecting to the walls or the top of the chamber onto the belt. The agitators may have thin steel blades or be made of steel wire.

The solvent vapor is preferably recovered by contacting with the auxiliary liquid in a mixer condenser or in the form or rain falling onto a vertical surface. The auxiliary liquid should of course be recycled, generally through an appropriate cooling system.

The invention may be adapted to the treatment of feed liquids from two or more sources through metering pumps so as to leave different ingredients in the final product. Preliminary mixing, agitating and the like may thus be avoided. The recycle circuit should comprise means for separating and eliminating in proportion the solvent from the auxiliary liquid and collecting it in accordance with one of the different methods above mentioned. A primary freezing cycle may serve at one time for cooling the auxiliary liquid and for supplying the required heat for the evaporation or sublimation. A secondary freezing cycle may serve for continuously prefreezing the products to be treated in the state of sleet or icicles and at the same time for supplying the heat necessary for melting the solvent when it is collected by crystallization as is usual. These thermal recovery phases are important not only from the economical point of view in regard to the cost price of the plant, but also from the technical point of view for the simplification in practice, and of the thermal equilibrium of the whole system in operation.

The invention is illustrated by way of example in the accompanying drawing in which:

FIGURE 1 diagrammatically represents the complete cycle of treatment of liquid products, while FIGURE 2 is a variant on a portion of the plant of FIGURE 1.

FIGURE 1 shows a freezer (or prefreezer) and pulverizer apparatus 43, the operation of which is continuous, and which is capable of transforming a liquid into sleet or icicles by spraying and instant freezing in a stream of cold air.

There is also a sublimation chamber or pressure boiler 18 comprising belt conveyors 19 for the product which travel over heating plates 8; a jet mixer or condenser 20, the purpose of which is to collect the vapors to be condensed; and a vacuum vessel 25 for receiving the exhaust from the condenser 20 and which can work under vacuum or at the atmospheric pressure as in FIGURE 2 as 25a, both provided with complementary devices for melting and separating the solvent from the unfreezable cooling liquid. A main freezing cycle has a compressor 1 for cooling the unfreezable liquid which collects the vapors of the solvent, and supplying the heating plates 8 with the heat necessary for evaporating the solvent, using the heat of condensation of the refrigeration agent itself.

A secondary refrigeration cycle comprises a compressor 53 for cooling the air to freeze the sprayed product into sleet or icicles, and melting the solvent to be recovered or eliminated in the liquid phase, by exchange or heat with the refrigeration agent. The refrigeration compressor 1 sucks the gases of the freezing agent coming from an evaporator made of a bundle of down-comers 3, through the conduit 2. The refrigeration agent evaporates inside pipes 4 of the evaporator whilst cooling of the unfreezable liquid takes place within the pipes 5, the unfreezable liquid being recycled continually by means of a pump 30 between the evaporator, the condenser 20, and the vesesl 25 under vacuum and located underneath the condenser 20.

The condenser 20 draws vapors of the products submitted to treatment under vacuum in the sublimation room 18 with which it is in close communication by the conduit 21.

The main refrigeration cycle on the high pressure side is provided with two condensers connected in series by a pipe 7. In the first condenser 6 the heat removed can be wholly or partially transmitted to the cooling water, which is sent to the condenser 6 through a pipe 14 and then exhausted in the thermostatically appropriate quantity through a pipe 15. The second condenser 9 provided in heating plates 8, through which a liquid fraction of the refrigeration agent, which has not condensed in the condenser 6 is passed and will condense, thus supplying the heat necessary for the evaporation of the solvent. This operation avoids overheated gases reaching the heating plates 8. Refrigeration agent in the liquid state collects in the lower portion of the heating plates 8 and flows out of the sublimation chamber 18 through a pipe 10, into a collection vessel 11, from which it returns to the evaporator down-comers 3 through an expansion valve 13, thus being again recycled.

The cooling water for the first condenser 6 is controlled at the inlet by a pneumatic valve 16, which is servo-controlled by a pressure responsive actuator 17 as a function of the pressure of the refrigeration agent. The pressure responsive actuator 17 is adjusted so as to have the cooling water flowing only when the pressure, and consequently the temperature of the refrigeration agent is above the pre-established datum of 30/40° C. The refrigeration agent will condense at the pre-established temperature in the space 9 in the heating plates 8 within chamber 18. These plates 8 transfer the heat of condensation to the solvent in chamber 18 and evaporate the same. The vapors of the solvent are then evacuated from chamber 18 to the condenser 20 by conduit 21.

The quantity of heat supplied for the evacuation of the solvent should be the same as is necessary to reduce the vapors to a lower thermal level. The thermal energy which is produced by the compressor 1 (which amounts to about 12% of the total heat produced by the condensation process in this particular embodiment) is added to the quantity of heat supplied for the evacuation of the solvent. If this heat excess should not be eliminated in the first condenser 6, a progressive increase of condensation pressure, and therefore of temperature, takes place in the heating plates 8. In order to prevent this difference of thermal equilibrium, the pressure responsive actuator 17 on the cooling water of the first condenser 6 is set by means of a determined flux of sufficient water to eliminate the excess of heat so as to ensure a constant temperature of the heating plates 8. In practice, by applying such a method, a lower quantity of water will be necessary, the economy reaching about 90% of that of the conventional methods, wherein almost all the heat of condensation is lost with the cooling water. This heat recovery is very important not only from the economical point of view for eliminating other external sources of thermal energy, but also because the internal surfaces of the heating plates 8, being in contact with a quantity of condensed vapor, will enjoy uniform temperature on their internal surfaces and thus provide the most favorable conditions to obtain a high coefficient for the transmission of heat. The conditions of this thermodynamic cycle provide thermal self-equilibrium for the heat transmission due to the sublimation of the solute (positive heat) is identical to the quantity of heat absorbed for the recrystallization of the solvent (negative heat).

The condenser is submitted to vacuum through the connection in the upper portion of the piping 23, which is connected to the vacuum system. The condenser 20 is fed through a pipe 24 with an unfreezable cooling liquid.

The condenser 20 is as close as possible via the pipe 21 to the sublimation chamber 18 containing the products to be treated, from which it sucks the solvent vapors which are collected by contacting with the refrigeration liquid. The condenser 20 also provides for a dynamic drawing together of the vapors due to the speed imparted to the liquid by the funnel shaped orifices 22. This combined action of contacting and dynamic transmission increases the efficiency of the condenser 20, within which the cooling liquid collects the solvent vapors, by freezing them instantly, and by drawing together the crystals formed within the vessel 25, which vessel is under vacuum provided by a pipe 23 connected with a vacuuc system. A pipe 27 brings the liquid from the mixer 20 to the vessel 26 which is of conical shape with a hemispherical bottom in order to facilitate and accelerate the separation of the crystals from the liquid as it is thrown upwards. The liquid, freed of the crystals, is sucked through the conical bottom of the vessel 25 and sent through a pipe 29 to the recycling pump 30.

In initiating the operation of the plant, the level of the cooling liquid in the tank 25 corresponds approximately to the line indicated by the arrow 60. During operation the crystals are separated from the cooling liquid and collect at the surface of the liquid, in a proportion to the liquid such that they form a condensed mass, which, after reaching the upper edge of two conical walls 28 forming an isolating annular chamber, is transferred into the external upper annular chamber, wherein a condenser coil 55 of the secondary refrigeration cycle exchanges the heat of the condensing refrigeration agent at a temperature, and in a quantity, which is only sufficient to promote the transformation of the solvent crystals into the liquid state. The secondary refrigeration cycle comprises the compressor 53 and an evaporator 51 for cooling the air. The compressor 53 sucks the refrigeration agent from the evaporator 51 through a connecting pipe 52. The refrigeration agent proceeding through main pressure piping 54 liquifies in the condenser coil 55. From the condenser 55 the refrigeration agent is recycled through pipe 56 and expansion control valve 57. Due to the condenser 55 the condensation of the refrigeration agent takes place at only a few degrees above 0° C., which considerably improves the operation of the cycle, using less energy, and consequently smaller compressor. A state of equilibrium exists between the quantity of heat (negative heat), which is subtracted from the condenser 55, and the quantity of heat (positive heat) necessary to liquify the crystals due to the treatment of an equal quantity of the solvent before freezing, and on melting. The excess of condensation is used for heating the small percentage of the not freezable liquid drawn by the solvent crystals.

The mass reduced to the liquid state about the condenser coils 55, is sucked by a metering pump 32 through a pipe 31 and passed through a pipe 33 into a separator 34, which works on the principle of the difference of density between the solvent, which is less dense and immiscible with the refrigeration liquid. Accordingly, the solvent into the external annular chamber provided by a diaphragm 35 directed to the upper exhaust pipe 36, through which it flows to the outside, whilst the cooling liquid, separated at the bottom of the separator 34 from the solvent, is recycled through the piping 37 which is in communication with the vacuum vessel 25.

The float 38 is adjusted according to the density of the refrigeration liquid used. Its density is a little greater than that of the solvent so as not generally to raise valve 39 from its seating, but only in the presence of a heavier liquid. The float 38 is adjusted at a height such that at a liquid. The float 38 is adjusted at a height such that at a low level of the liquid hydraulic closure preventing any air penetration is ensured.

The system described allows the collection of vapors regardless of an atmospheric pressure, particularly since the condenser 20 is as near as possible to the sublimation chamber 18 so as to ensure a short and free transfer of sublimation vapor, as well as to reduce collision of molecules of different kinds with one another as well as heavy load losses.

If for a particular process, it is decided to use a high pressure condenser, an exhaust tank is provided which operates at atmospheric pressure, as shown in FIGURE 2, and within which tank practically all the same operations are carried out as in the exhaust tank 25 under vacuum and the separator 34 as illustrated in FIGURE 1. As illustrated in FIGURE 2 an exhaust pipe 27a, connected to the condenser, will send the liquid into a vessel 26a (like 26). As the mass reaches the upper edge of vessel 28a it flows over into the external annular chamber in which condenser tubular coil 55a of the secondary refrigeration cycle is located and where the heat exchange will promote the liquefaction of the crystals. The solvent, being less dense, rises into the external annular chamber above the diaphragm 35a, where its separation is completed and it is discharged through an overflow pipe 36a. The refrigeration liquid whose density is greater is collected from the bottom of the vessel 26a by a pump 32a, the purpose of which is to recycle the liquid through a sucking pipe 29a of the recycling pump 30, as shown in FIGURE 1. The remaining parts numbered in FIGURE 2 correspond to those similarly numbered in FIGURE 1, being distinguished by the letter a.

The liquid product to be treated is introduced into the refrigeration and pulverizer apparatus 43 through a feed pipe 40, thus falling through the distributing pipe 41 onto the centre part of a centrifugal pulverizing device 42. Inside the freezer chamber 44, the pulverized liquid is drawn into a violent turbulence of low temperature air streams, which are kept in circulation by a fan 49, which ensures the circulation of air between the cooling coil of the evaporator 51 and the freezer chamber 44 crossing two or more air inlet collectors 46 disposed at the periphery of the freezing apparatus 43. The collectors 46 are connected together by a compressor pipe 50 for the cold air, and they feed the air into the chamber 44 through splits 45 disposed in correspondence to the collectors 46. The splits 45 are provided with directing ribs 47 in order to impart to the air the required travelling movement in order to promote a cyclonic play of the air and some suspension of the frozen liquid in the cold air stream. By controlling the speed and turbulence of the air and its temperature, and the grade of dispersion of the product within the air it is possible to freeze the product in snow flakes or icicles of different size or shape. The product solidified by freezing in one of the aforesaid forms falls under gravity, and the throwing effect of the air directed to the bottom of the chamber 44 of the freezer. The air liberated by the product is sucked by the fan 49 through a pipe 48, and recycled with the eventual intervention of the pipe of a separation cyclone.

The sleet or icicles from the bottom of the freezer 43 pass into the sublimation chamber 18 traversing a rotating valve 58 which maintains the pre-established vacuum. The valve 58 discharges the product onto the belt 19 on which a very uniform and porous layer of product is formed. One or more of such belts 19 overlap each other, are made of thin and flexible metal sheet and slowly slide over the heating plates 8 inside the sublimation chamber 18. The heating plates 8 transmit the sublimation heat to the product distributed on the belts 19. The edges of the belts 19 are reinforced so as to withstand the force exerted in order to provide transport. The belts 19 adhere well, owing to their flexibility, to the upper surface of the heating plates 8.

Cross-bars having thin steel blades 61 overhang the belts 19, their ends being fastened to the inside of the chamber 18. The blades 61 form a comb, which, during its travel, enters and splits the porous and friable layer of material forming narrow grooves. By means of this procedure, the material treated is subjected to displacement rearrangement and tumbling when the layer is in advanced state of lyophilization, thus facilitating the sublimation of the solvent.

At the end of the travel of the conveyor belt or belts 19 the wholly dried product is discharged through a rotating valve 59 similar to the valve 58 for the introduction of the frozen solution into the sublimation chamber 18.

What is claimed is:

Apparatus for continuously removing solvent from a solution comprising,
 (a) a pulverizer for the solution,
 (b) a refrigeration circuit having a condenser and evaporator, means for circulating air over the evaporator and through said pulverizer,
 (c) valve means for transferring frozen solution from said freezer,
 (d) means including a chamber for receiving the frozen solution from said valve means and being adapted for the sublimation and the evaporation of solvent from the frozen solution,
 (e) means for the recovery of the solute from said chamber means, and
 (f) means for the recovery of the solvent, said solvent recovery means comprising,
  (1) a condensing chamber in communicating with said chamber means for receiving the vapors of the solvent,
  (2) said condensing chamber also being in communication with a supply of recirculating, unfreezable liquid whereby the vapors and unfreezable liquid contact one another and a mixture of solvent crystals and unfreezable liquid is produced at an outlet of said condensing chamber,
  (3) a pressure vessel communicating with the outlet of said condensing chamber and having the condenser of the refrigeration circuit in the pressure vessel in heat exchange relationship with fluids from the outlet of the condensing chamber whereby the positive heat utilized to change solvent crystals in said vessel back to liquid is equal to the negative heat surrendered by said condenser,
  (4) separator means connected to said vessel for separating the unfreezable liquid from the liquid solvent formed by the heat exchange relationship,
  (5) said vessel having a conical member with a hemispherical bottom to assist in separating the unfreezable liquid from the solvent crystals, and
  (6) said condensing chamber having a series of vertically spaced funnel-shaped orifices through which the unfreezable liquid is passed downwardly therethrough.

References Cited by the Examiner

UNITED STATES PATENTS

| | | | |
|---|---|---|---|
| 1,232,269 | 7/1917 | Forbes | 159—4 |
| 1,917,841 | 7/1933 | Hughes et al. | 159—4 |
| 2,388,134 | 10/1945 | Flosdorf et al. | 34—5 |
| 2,507,632 | 5/1950 | Hickman | 34—5 |
| 2,528,476 | 10/1950 | Roos et al. | 34—5 |
| 2,751,687 | 6/1956 | Colton | 34—5 |

NORMAN YUDKOFF, *Primary Examiner.*

F. E. DRUMMOND, *Assistant Examiner.*